United States Patent
Miller et al.

(10) Patent No.: US 11,860,683 B1
(45) Date of Patent: Jan. 2, 2024

(54) SYSTEM AND METHOD FOR BENCHMARKING AND ALIGNING CONTENT TO TARGET AUDIENCES

(71) Applicant: Pluralytics, Inc., Wayzata, MN (US)

(72) Inventors: Alisa Miller, Wayzata, MN (US); Richard Byrne, Winchester, MA (US); Morteza Shahriari Nia, Arlington, MA (US)

(73) Assignee: Pluralytics, Inc., Wayzata, MN (US)

( * ) Notice: Subject to any disclaimer, the term of this patent is extended or adjusted under 35 U.S.C. 154(b) by 0 days.

(21) Appl. No.: 17/852,232

(22) Filed: Jun. 28, 2022

Related U.S. Application Data

(60) Provisional application No. 63/216,266, filed on Jun. 29, 2021.

(51) Int. Cl.
   *G06F 40/157* (2020.01)
   *G06F 16/332* (2019.01)

(52) U.S. Cl.
   CPC ........ *G06F 40/157* (2020.01); *G06F 16/3329* (2019.01)

(58) Field of Classification Search
   CPC .... G06F 40/253; G06F 40/284; G06F 40/106; G06F 40/279; G06F 40/157; G06F 16/3329
   See application file for complete search history.

(56) References Cited

U.S. PATENT DOCUMENTS

| | | | | |
|---|---|---|---|---|
| 10,706,109 | B2* | 7/2020 | Ansari | G06F 16/93 |
| 2010/0042623 | A1* | 2/2010 | Feng | G06F 16/35 |
| | | | | 707/E17.127 |
| 2010/0161709 | A1* | 6/2010 | Fourman | H04L 67/306 |
| | | | | 709/203 |
| 2013/0253910 | A1* | 9/2013 | Turner | G06F 40/253 |
| | | | | 704/9 |
| 2015/0127748 | A1* | 5/2015 | Buryak | H04L 51/52 |
| | | | | 709/206 |
| 2015/0195220 | A1* | 7/2015 | Hawker | H04L 51/216 |
| | | | | 707/723 |
| 2016/0103824 | A1* | 4/2016 | Zupancic | G06F 40/205 |
| | | | | 704/9 |

(Continued)

*Primary Examiner* — Wilson W Tsui
(74) *Attorney, Agent, or Firm* — Jackson Walker LLP

(57) ABSTRACT

Disclosed subject matter benchmarks and aligns content with target audiences. A user may provide content to a language intelligence platform. Scores are then generated by analyzing the content based on values-specific dictionaries, which reflect values of targeted audiences. Based on a comparison between a generated score and a benchmark values score for the target audience, appropriate action may be taken. Disclosed teachings support multiple layers of comparisons and score calculations including comparisons and scoring of all text, segments of text, and specific phrases to achieve a more comprehensive analysis. Embodiments may determine whether headers or other sections that may garner more attention, are aligned with a benchmark. Instead of suggesting alternative content, customer-specific benchmarks may tailor the analysis to align with customer's goals and priorities, potentially resulting in additional performance indicators that support the identification of correlations and predictive lexical patterns of higher performing content.

20 Claims, 7 Drawing Sheets

(56) References Cited

U.S. PATENT DOCUMENTS

| | | | | |
|---|---|---|---|---|
| 2016/0147760 A1* | 5/2016 | N | ............... | G06F 16/3322 |
| | | | | 707/751 |
| 2017/0017721 A1* | 1/2017 | Sauper | ............... | G06F 16/248 |
| 2019/0012391 A1* | 1/2019 | Eriksson | ............... | G06Q 30/02 |
| 2021/0019371 A1* | 1/2021 | Saha | ............... | G06F 40/30 |
| 2021/0264109 A1* | 8/2021 | Srinivasan | ............... | G06N 3/088 |
| 2021/0397793 A1* | 12/2021 | Li | ............... | G06N 20/00 |

\* cited by examiner

SYSTEM AND METHOD FOR BENCHMARKING AND ALIGNING CONTENT TO TARGET AUDIENCES

CROSS-REFERENCE TO RELATED APPLICATIONS

The present application claims priority to U.S. Provisional Patent Application No. 63/216,266 filed on Jun. 29, 2021 and titled "System and Method for Benchmarking and Aligning Content to Target Audiences", the entirety of which is incorporated by reference herein.

FIELD OF TECHNOLOGY

The present invention relates to the field of language and text analysis, specifically benchmarking distinct user group attitudes and aligning content with target audience appeal to achieve user-defined objectives while taking into account user-defined values, tone, and style.

BACKGROUND

A current area of active research in machine learning and language prediction systems is the automatic generation of realistic text given a set of user-defined parameters. It is generally considered advantageous to tailor and optimize a document to ensure it captures the attention of an intended audience. Different groups of the population have different values and care about different things. Differences in values may be indicative of why different groups shop at different places, read different books, think differently and use different language to communicate. However, without prior knowledge of the values of specific audiences, content providers may not know which words resonate with each target audience. For example, certain people shop at Whole Foods Market™ for their groceries, while other people shop at Trader Joe's™. While both stores are American chain grocery stores, their customers may have different profiles that reflect different values and/or other characteristics of each group. In addition, conventional language prediction systems generally face challenges regarding accuracy. For example, these generated language prediction systems lack reliability and interpretability. Interpretability is the degree to which a machine learning model can be understood in human terms. The higher the interpretability, the more a human can consistently predict the model's result and understand the reasoning or relevant knowledge behind the predictions and decisions made by the model given the relationships contained in the data. The quality of a machine learning model is only as good as the data used to train and generate the model. The fundamental values used as the basis for our machine learning models are generally better at identifying the relationships and patterns between the language used for various segments of the population.

BRIEF SUMMARY OF THE DISCLOSURE

Subject matter included herein draws upon a universal values model and a system with empirical support that captures the ideals that shape subjective beliefs and actions of individuals and groups in society. Values are core to social sciences in explaining motivational bases of perspective and behavior. They are inherently different from other concepts commonly used to explain behavior such as attitudes, personality, beliefs, norms, and traits. Values are trans-situational and not limited in the situations which they can be applied. Values are also more than descriptive variables or patterns of thinking and feeling. They are motivational variables of learned nature and deeply held principles that guide people's choices and influence emotions. Disclosed subject matter also utilizes psychological considerations including, but not limited to, the mere exposure effect (also known as the familiarity principle) and the concept of perceptual fluency. The mere exposure effect is a psychological phenomenon whereby people tend to develop a preference for certain things based on the frequency at which a user becomes exposed to said thing or person. Perceptual fluency is an unconscious and automatic memory whereby a subject is not necessarily aware of the prior exposure to the stimulus. All these considerations contribute to the accurate assessment of how well a text aligns with a certain target audience.

The above-referenced problems are addressed and other advantages are realized by methods and systems of the present disclosure, which benchmark and align content with target audiences. In at least one embodiment, a user provides content to a language intelligence platform via a text entry interface. Scores are generated by analyzing all or portions of the content based on values-specific dictionaries, i.e., dictionaries that reflect the values of targeted audiences. Values may be defined as the principles and attitudes that drive a person's decision making. Based on the comparison of the score with a benchmark values score for the target audience, alternative content is suggested to the user.

Addressing the previously referenced accuracy challenges of prior art, the teachings of the subject matter disclosed herein allow for multiple layers of comparisons and score calculations including, as non-limiting examples, comparisons and scoring of all text, segments of text, and specific phrases. Utilizing multiple layers of comparison ensures a more comprehensive analysis of the content. A more refined understanding is achieved by determining whether certain sections are aligned with a benchmark. This can be beneficial when, as an example, determining whether a header is aligned by itself versus the whole document. A title or section heading often garners the most attention given its prominence and location. Thus, it is imperative that this content accurately align with the target audience values to generate the most impact. Providing a benchmark score as a standard to compare against beneficially improves quality. In at least some alternative embodiments, the practice of suggesting alternative content to increase scores is omitted. Instead, customer-specific benchmarks tailor the analysis to align with customer's goals and priorities. Multiple content across multiple platforms is evaluated. The analytics performed in place of the suggestion of alternative content, generates additional key performance indicators that allow the identification of the correlations and predictive lexical patterns of higher performing content.

It will be understood that, as used in the following description and claims, the terms "content" and "electronic document" both refer to any document, media, webpage, or text.

An embodiment of at least one method disclosed herein comprises providing, by a user, content to be evaluated with respect to how well the content aligns with a target audience; identifying a plurality of distinct values segments, which represent groupings of statistically different audience divisions that embody certain values; generating a language dictionary for each of the plurality of values segments that includes predictive words or phrases, wherein each word or phrase entry includes scores depending on the measured level of prediction (e.g., numerical values associated with predicting the appeal) of one or more values segment; setting a plurality of benchmark scores based on user defined specific alignment objectives; comparing a plurality of assessment scores with the plurality of benchmark scores to calculate an overall alignment assessment; and, based at least in part on the overall alignment assessment, suggesting modifications to the provided content to increase the overall alignment.

An embodiment of disclosed subject matter teaches a non-transitory computer readable medium including computer-executable instructions that enable a computer to perform operations comprising providing, by a user, content to be evaluated with respect to how well the content aligns with a target audience; identifying a plurality of distinct values segments, which represent groupings of statistically different audience divisions that embody certain values; generating a language dictionary for each of the plurality of values segments that includes predictive words or phrases, wherein each word or phrase entry includes scores depending on the measured level of prediction of one or more values segment; setting a plurality of benchmark scores based on user defined specific alignment objectives; comparing a plurality of assessment scores with the plurality of benchmark scores to calculate an overall alignment assessment; and, based at least in part on the overall alignment assessment, suggesting modifications to the provided content to increase the overall alignment.

An embodiment of subject matter disclosed herein teaches one or more computer systems, sometimes referred to herein simply as systems, suitable for evaluating an alignment of an electronic document with a target benchmark. Each such system may include a processor for executing computer program instructions and a non-transitory computer readable storage medium storing computer program instructions that, when executed by the processor, cause the system to perform operations including receiving, from a user via a use interface, content to be evaluated with respect to how well the content aligns with a target audience; identifying a plurality of distinct values segments, which represent groupings of statistically different audience divisions that embody certain values; generating a language dictionary for each of the plurality of values segments that includes predictive words or phrases, wherein each word or phrase entry includes scores depending on the measured level of prediction of one or more values segment associated; setting a plurality of benchmark scores based on user defined specific alignment objectives; comparing a plurality of assessment scores with the plurality of benchmark scores to calculate an overall alignment assessment; and, based at least in part on the overall alignment assessment, suggesting modifications to the provided content to increase the overall alignment.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE DISCLOSURE

Certain embodiments of the disclosure may be found in a method and system for benchmarking and aligning content with target audiences. In such embodiments, a document or other content is provided by the user. Each word and phrase is analyzed and compared to generated dictionaries directed towards targeted audiences based on their values to generate a score. Based on the comparison of the score with a benchmark values for the target audience, alternative content is suggested to the user.

Values are inherently different from other concepts commonly used to explain behavior such as attitudes, personality, beliefs, norms, and traits. Values are a central concept in social sciences that are crucial in explaining motivational bases of perspective and behavior. Values can be determined using Shalom Schwartz theory of basic values (Schwartz, S. H. (2012). An Overview of the Schwartz Theory of Basic Values. Online Readings in Psychology and Culture, 2(1). https://doi.org/10.9707/2307-0919.1116) or any similarly related social psychology models. Some embodiments may recognize five or more broad personal values that are differentiated by the underlying goal or motivation: self-direction, stimulation, hedonism, achievement, power, security, conformity, tradition, benevolence, and universalism. While other embodiments may recognize less of the broad personal values.

As mentioned above, there are many language processing systems which provide content variants depending on different factors. Such systems, however, generally do not accurately align content variants with target audiences, nor do they take into account an ideal benchmark model.

Figure 1:
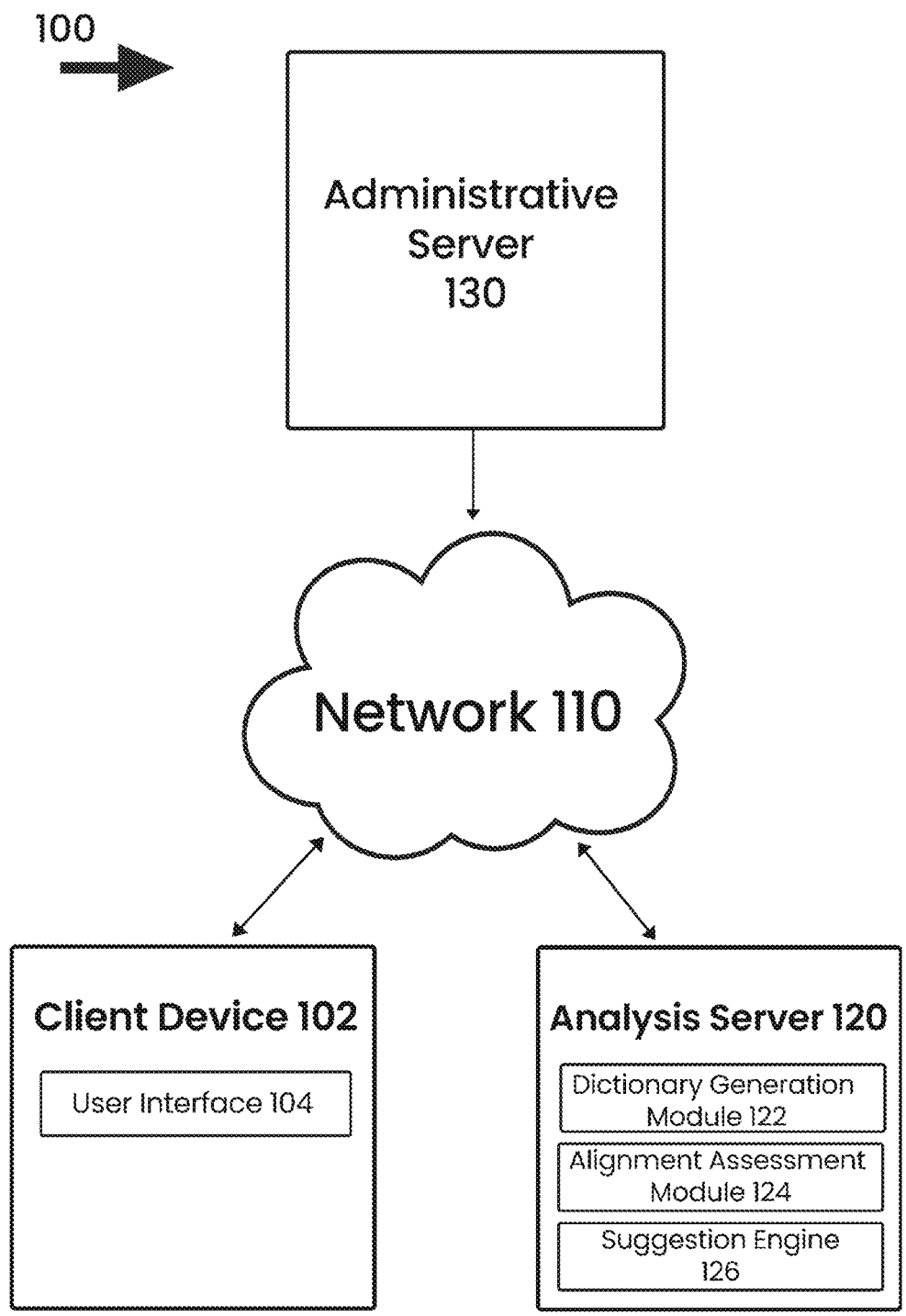
FIG. 1 illustrates an exemplary system in accordance with disclosed teachings.

FIG. 1 illustrates an exemplary system 100 in accordance with disclosed subject matter. A client device 102 is a computing device such as a tablet computer, a laptop computer, smartphone, or any other type of network-enabled device. The client device 102 is communicatively connected by a network 110 to an analysis server 120 and administrative server 130. Analysis server 120 and administrative server 130 may each be implemented with a computer including at least one processor (not depicted in FIG. 1) coupled to one or more memory and/or storage resources (not depicted in FIG. 1) and one or more input/output I/O devices via a chipset (not depicted in FIG. 1). Storage resources may be implemented as non-transitory computer readable storage media such as a hard drive, compact disk read-only memory (CD-ROM), DVD, or a solid-state memory device. Memory resources may hold instructions and data used by the processor.

The network 110 provides communication between the client devices 102, analysis servers 120 and administrative servers 130. The network 110 may include a public network such as the Internet, but may be any network, including but not limited to a Local Area Network (LAN), Wide Area Network (WAN), a mobile wired or wireless network, a private network, or a virtual private network.

The illustrated analysis server 120 includes a Dictionary Generation Module 122, an Alignment Assessment Module 124, and a Suggestion Engine 126. The illustrated client device 102 may provide text to the analysis server 120 via a User Interface 104. Although there is only one instance depicted, there may be multiple instances of the client device 102 in communication with one or more analysis servers 120 or administration servers 130.

Figure 2:
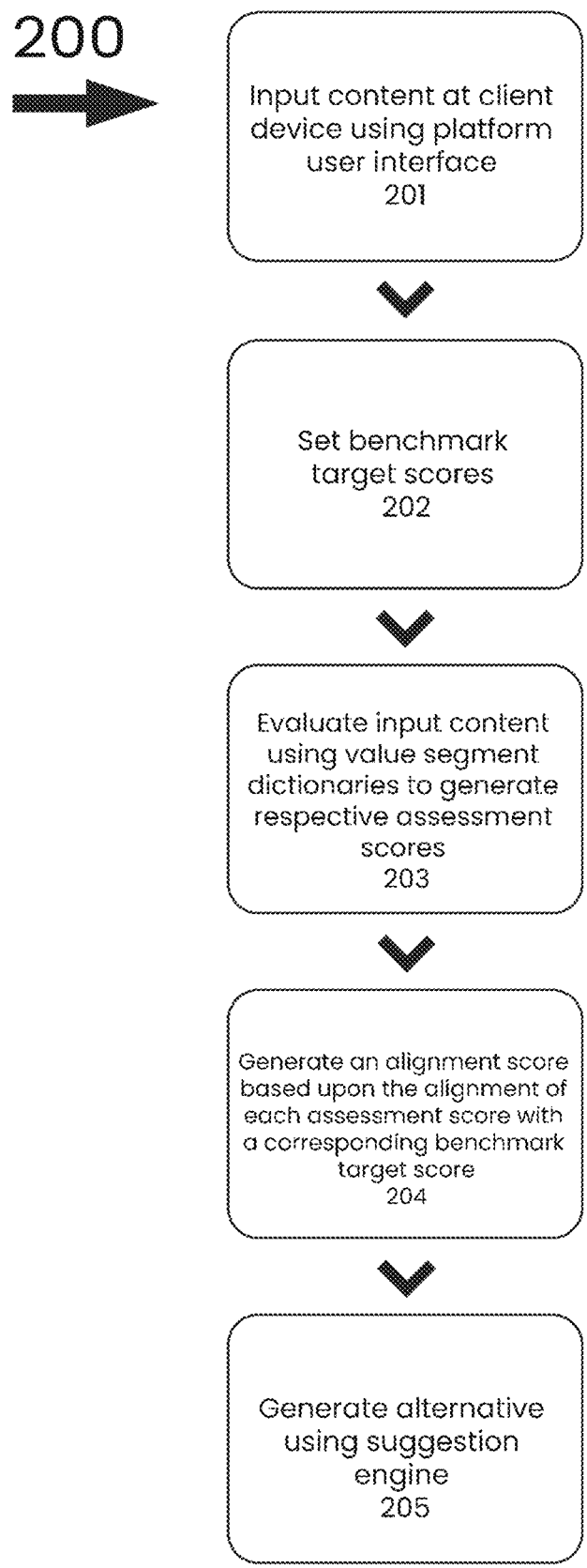
FIG. 2 illustrates a process flow for an exemplary method in accordance with disclosed teachings.

FIG. 2 illustrates a flow diagram for an exemplary method 200 for benchmarking and aligning content to targeted audiences. At 201, a user inputs content at the client device 102 (FIG. 1) using the User Interface 104 (FIG. 1). The user then sets a benchmark target score at 202. The benchmark target score represents an ideal mix of language distribution across an applicable values dictionary. In an exemplary embodiment, the machine-learned models based on the universal values generate five values segments: Safety First, Ladder, Hearth, Global Me, and Free Spirit; and each of these values segments may include a rank order, and a level of priority or weighting placed on the various universal values. Safety first values segments may prioritize protection and safety and can be characterized as risk avoidant, nostalgic, conservative leaning, self-reliant, keeps within their circle of friends, and price conscious. Ladder values segments may prioritize the importance of achievement and can be characterized as seeking to influence others, being on trend, progressive and conservative people, environmentally engaged, and more likely to be religious. Hearth values segments may prioritize tradition and can be characterized as being grounded in faith, thrifty/frugal, nostalgic, outdoor/country, self-reliant, appreciating simple happiness, civically engaged. Global Me values segments may prioritize self-expression and can be categorized as having a global perspective, self-expression, searches for meaning, civically engaged, environmentally engaged, values social justice, appreciates exploration, and a news consumer. Free Spirit values segments may prioritize variety and are characterized as being fun and enjoyment seekers, craves new, varied experiences, independent minded, not as active civically, thrill-seeking, middle of the road politically, interested in collectables, enjoys sports, and values self-direction. Target audiences will fall within any combination of these values segments. Depending on their classifications, different benchmarks will be set to reflect their alignment accordingly. As one example, a traveling enthusiast demographic might have higher benchmarks in Free Spirit and Global Me values segments, while medium to low benchmarks in the other values segments. A benchmark greater than 100 out of 300 may be deemed a priority values segment.

The input content from 201 is then evaluated using the values segment dictionaries to generate respective assessment scores 203. In at least one embodiment, content is traversed and words belonging to the various values segment dictionaries are identified. Within each values segment dictionary, a word or phrase entry includes a numerical score representing its likely appeal to each values segment. The associated scores for each instance identified in the dictionaries are aggregated to generate values segment assessment scores. In at least another embodiment, tone and/or style can be evaluated to generate an assessment score. An alignment score is calculated for each generated assessment score with respect to the corresponding benchmark target score at 204. Subsequently, the Suggestion Engine 126 generates alternative content at 205 based on the values alignment assessment score, the tone alignment assessment score, the style alignment assessment score, overall alignment assessment, or any combination thereof. For example, the Suggestion Engine 126 suggests words that would improve the content alignment by coming closer to the benchmark target score for either values, tone, or stylistic elements, as well as when these elements are combined. The above process will be further elaborated with the respective drawings and descriptions below.

In at least one embodiment, disclosed systems and method include and/or employ one or more Neural Networks. Neural Networks are a deep learning algorithm commonly used to recognize underlying relationships in a set of data. Traditional neural networks are structured to mimic the functioning of the human brain with neurons signaling to one another. There are various types of neural-network based methods used to generate models to deal with particular problems, including Convolutional Neural Networks (CNNs), Recurrent Neural Networks (RNN), Long Short-Term Memories (LSTMs), and similar. Typically, there is an input layer, one or more hidden layers, followed by an output layer. Each node in a respective layer is connected to another node in the subsequent layer with an associated weight and threshold. Fully recurrent neural networks connect the outputs of all neurons to the inputs of all neurons. However, the neural network in our application dispenses with recurrence and convolutions entirely. This yields models of superior quality while allowing models to be more parallelizable and requiring significantly less time to train. In the exemplary embodiment, the neural network is trained with survey data of unstructured documents.

Figure 3:
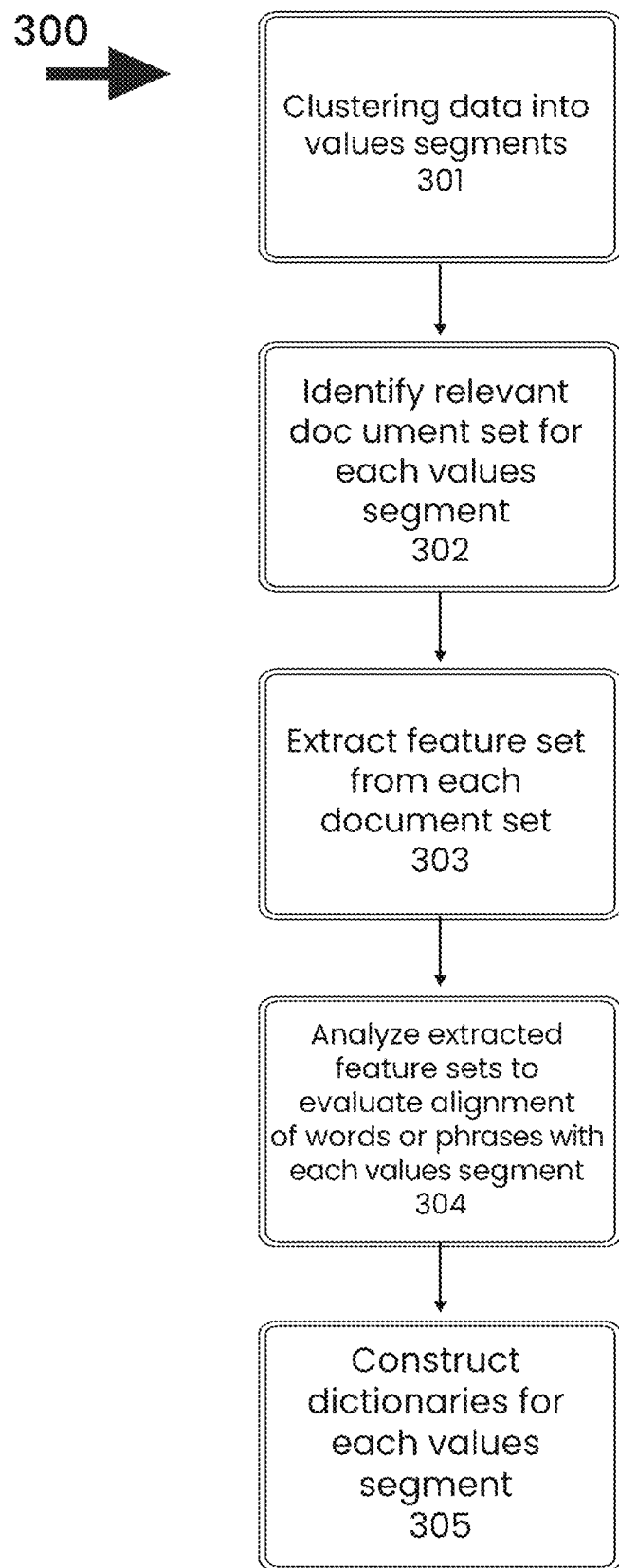
FIG. 3 illustrates generation of values language dictionaries in accordance with disclosed teachings.

FIG. 3 is a diagram that illustrates an exemplary generation method 300 of the values segment dictionaries in the Dictionary Generation Module 122. FIG. 3 will now be discussed in conjunction with FIG. 1 and FIG. 2. At 301, consumer data is clustered into values segments, which represent groupings of statistically different audience divisions.

Referring to FIG. 1, an analysis server 120 receives training data input to the machine-learned models. In some implementations, data can be fetched from a variety of public or private sources or domains. For example, MRI Simmons data can be clustered using K-means around key attitudinal questions that can be aligned to the ten custom categories of the Universal Values Model. Highly predictive indicators are selected from the model. In one embodiment, variation within the clusters is analyzed to generate 3 segments; and these 3 segments are then expanded to at least 5 values segments based on the findings. In other embodiments, the number of generated segments and expanded values segments may be more or less than 3 and at least five, respectively.

At 302, relevant document sets are identified for each values segment. In some implementations, structured or unstructured language data is input by a user at the client device 102 using the platform User Interface 104. In other implementations, content that indexes at a predetermined threshold for each segment is identified to generate a list of documents. For example, a threshold is computed to determine which URLs meet a high level of alignment with a values segment and which URLs show little to no correlation, or low alignment with a values segment. A list of URLs is identified for each values segment that satisfy the threshold level of alignment. Text is taken from each of the URLs on the list and filtered. Non-relevant URLs including but not limited to ads, footprints, disclaimers, privacy policies, etc., are removed from further scraping. In this embodiment, two levels of links within each specific domain on the homepage URL and other index pages are traversed and processed. In other embodiments, more or less levels of links within each specific domain on the homepage URL and other index pages may be traversed and processed.

At 303, a feature set is extracted from each document set. According to an exemplary embodiment, numerous linguistic and grammatical features are extracted from the processed document set. For example, words, phrases, high-frequency power words, linguistic inquiry and word count statistics and entities, N-grams, word embeddings, writing semantics, sentiments, tones, parse-trees, style and length can be extracted. The set of features uniquely characterize a document and indicate correlation to the values segments identified previously.

At 304, the Dictionary Generation Module 122 analyzes the extracted feature set to evaluate the alignment of words or phrases with each values segment. In some implementations, characteristics of extracted features, such as frequency, are measured and compared to the entire corpus of the values segment. The measured frequency is then compared to the high or low frequency of an out-group of the same segment. The highest quartiles of frequency where language appears is compared to the lowest quartiles of frequency. Highly predictive words exhibit higher frequency above a normalized mean of that values segment, while showing little to no frequency in the out-group. A word-level index is created based on this normalized mean so that words and phrases can be compared and scored across the values segments. Based on this scoring methodology, each segment exhibits distinct language characteristics. Words and phrases that are predictive are rarely highly predictive of more than two segments, and generally, are highly predictive of only one.

At 305, dictionaries are constructed for each values segment. In the exemplary embodiment, the Dictionary Generation Module 122 determines thresholds that define cut-offs and ceilings within each dictionary so that segment, word, or phrase indexes are not overly skewed based on outliers. The frequency scoring categorizes words and phrases into dictionaries of predictive words/phrases for each values segment. Other semantic features that are unique to each values segment are scored and are tagged as highly predictive of a segment. The more predictive a text feature is of a particular values segment, the higher it may be weighted in the scoring and optimization algorithm. Each dictionary may include entries of predictive words, phrases, or semantic features, with corresponding numerical amounts depending on the measured level of indication of a values segment.

These dictionaries may be updated from time to time, either periodically or otherwise, by ingesting new corpuses of language to reflect the fact that words can change in appeal across the values segmented based on changing events in culture and the natural evolution of language.

Figure 4:
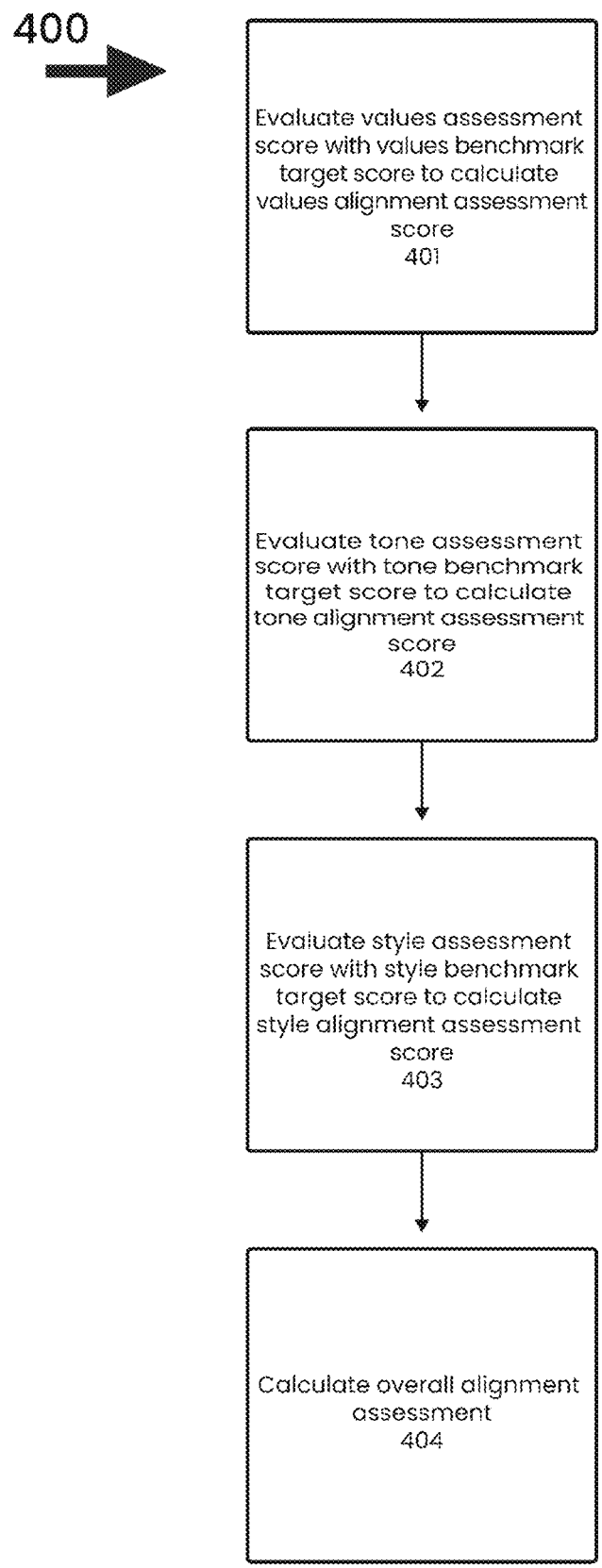
FIG. 4 illustrates an exemplary alignment assessment calculation in accordance with disclosed teachings.

FIG. 4 is a diagram that illustrates an exemplary alignment assessment calculation method 400. At 401, the values assessment score is evaluated with respect to the values benchmark target score. In some embodiments, the text input by a user using the User Interface 104 is scored based on one or more values language dictionaries and associated language scoring. In the exemplary embodiment, the text input by a user using the User Interface 104 is scored based on at least five values language dictionaries and associated language scoring. Each values segment is associated with a distinct values language dictionary that includes words or phrases likely to appeal to the corresponding segment with numerical scores reflecting the level of appeal. Each instance in the values language dictionary has an associated positive of negative score. A values assessment score is generated by aggregating each instance of the values language dictionary present in the inputted text sample. A vector, or mapping of values appeal is generated for the input piece of content. The range of the values assessment score for each segment is 0-300, where 300 is the highest level of prediction of appeal for a given segment. Scores are compared to a predetermined threshold to identify the level of appeal. In the exemplary embodiment, scores above 100 are considered more appealing. Scores below 100 are considered less appealing.

The values benchmark target score is set for each respective values segment. A values benchmark target score is set that represents a preferred mixture of language distribution across the various values dictionaries across the target segments. For instance, a preferred composition is displayed on an indexed scoring scale between 0-300. Users can have multiple benchmark profiles that consist of a set of unique values benchmark target scores for each goal or target audience alignment. The user defines specific settings and information about their audience target groups. In some implementations, additional target demographic characteristics are also provided. These inputs are processed using both statistical and heuristic models to generate the benchmark target scores. Once the values benchmark target scores have been set with specific targets across the values segments, the values assessment score is compared to the values benchmark target score to determine relative similarity or alignment with the benchmark settings.

In other implementations, multi-level scoring is performed. Alignment of text is scored as a whole and in components. For example, content is scored by analyzing the entire document to show the probability of that document to appeal the lexical profile of that values segment. Content may also be scored in the platform on a sentence and/or chunks level.

The values alignment assessment score is on a scale of 1-100. The Alignment Assessment Module 124 calculates the absolute value of relative entropy to capture how far the values assessment score is from the values benchmark target score. Certain values benchmark target scores can be designated a priority. Determination is made whether the priority values benchmark target scores are met. If the values assessment score is below the values benchmark target score, a penalty is applied. If the values assessment score is above the values benchmark target score, a flat credit is applied for each segment. Subsequently, non-priority values benchmark target scores are assessed. A total sum of the penalties, and credits is then calculated and thresholded with 100.

In accordance with the exemplary scenario, content can be provided separately on a per piece level, or at an aggregate results level through content feeds. Additional text is provided by the user to calculate their ideal values benchmark target score. Additional text could come in the form of top performing content, brand documentation, focus group transcripts, or combinations thereof. Target demographic characteristics may be provided by the user in the calculation of the values benchmark target score.

At 402, the tone assessment score is evaluated with the tone benchmark target score to calculate a tone alignment assessment score. In the exemplary embodiment, the analysis server 120 generates a machine learning model based on tone families and measures the presence of tones at high confidence levels for six to eight tone family groupings. In other embodiments, the analysis server 120 may generate a machine learning model based on tone families and measures the presence of tones at confidence levels for other ranges of family groupings. Manually collected and human-labeled families of tone datasets are input into the model. Tone evaluation is calculated using probabilistic models to predict the likelihood of the presence of a tone at a sentence of a statement level in a text. For instance, tones with predictions above 50% are indicated and tones above 80% probability are emphasized in the model. Settings can be modified for the level of confidence to provide the capability of showing different rankings of potential tones to assess the efficacy of the accuracy for tone scoring for a particular sentence or statement.

In a further embodiment, there is capability of adding additional tone families. Supervised and non-supervised learning is utilized. The previous datasets and models are regularly updated and used to retrain the tone detection machine learning model. The User also validates tone families in development beyond the current 6-8 tone family groupings. 5-10 additional tones at varying levels of recall and precision are tested and incorporated into the model.

In accordance with the exemplary scenario, the User selects their ideal tones and provides content exemplifying the ideal tone. A priority tone mix is then determined from the information provided by the User such that the tone family groupings are loaded into the platform as one or more tone benchmarks. In one embodiment, document level scoring looks for highly predictive presence above 50% probability of the tone presence by sentence. Aggregate scores meeting a threshold of alignment for tone are based on User defined thresholds for percentage of individual tones or presence across the entire priority tone palette as compared to presence of any other/non-priority tones. This generates a tone alignment assessment score.

At 403, evaluation of a style assessment score with a style benchmark target score is calculated to generate a style alignment assessment score. In the exemplary embodiment, many factors can contribute to style. One factor can be complexity. A readability test is used to gauge the understanding of a text. Applying the readability test generates an index of an approximate representation of the school grade level needed to comprehend the text. Additional modifications are provided to the scoring mechanism of the test to accommodate non-formal communications such as short non-sentence marketing material, hashtags, user handles, URLs, and the like.

Another factor can be formality. The formality level models ascertain the rigid observance of rules of convention or etiquette. There are datasets of differences between very informal to highly formal examples that express the same idea. For instance, "Howdy" and "Greetings" are both salutations on the varying spectrum of formality. Our models are sensitive to point of view ($1^{st}$-person, $2^{nd}$-person, $3^{rd}$-person), use of contractions, colloquial expressions, slang and abbreviations and text language. Our platform reads for these items and scores content on a per sentence or chunk based for Informal to Formal style, assigning a classifier or score for level of Formal. In another embodiment, results are aggregated to a full text score. The formality and complexity scores are used to generate a style assessment score, which is then compared to a style benchmark target score to generate a style alignment assessment score.

At 404, an aggregate of the values alignment assessment score, tone alignment assessment score, and style alignment assessment score is calculated to form an overall alignment assessment score.

Figure 5:
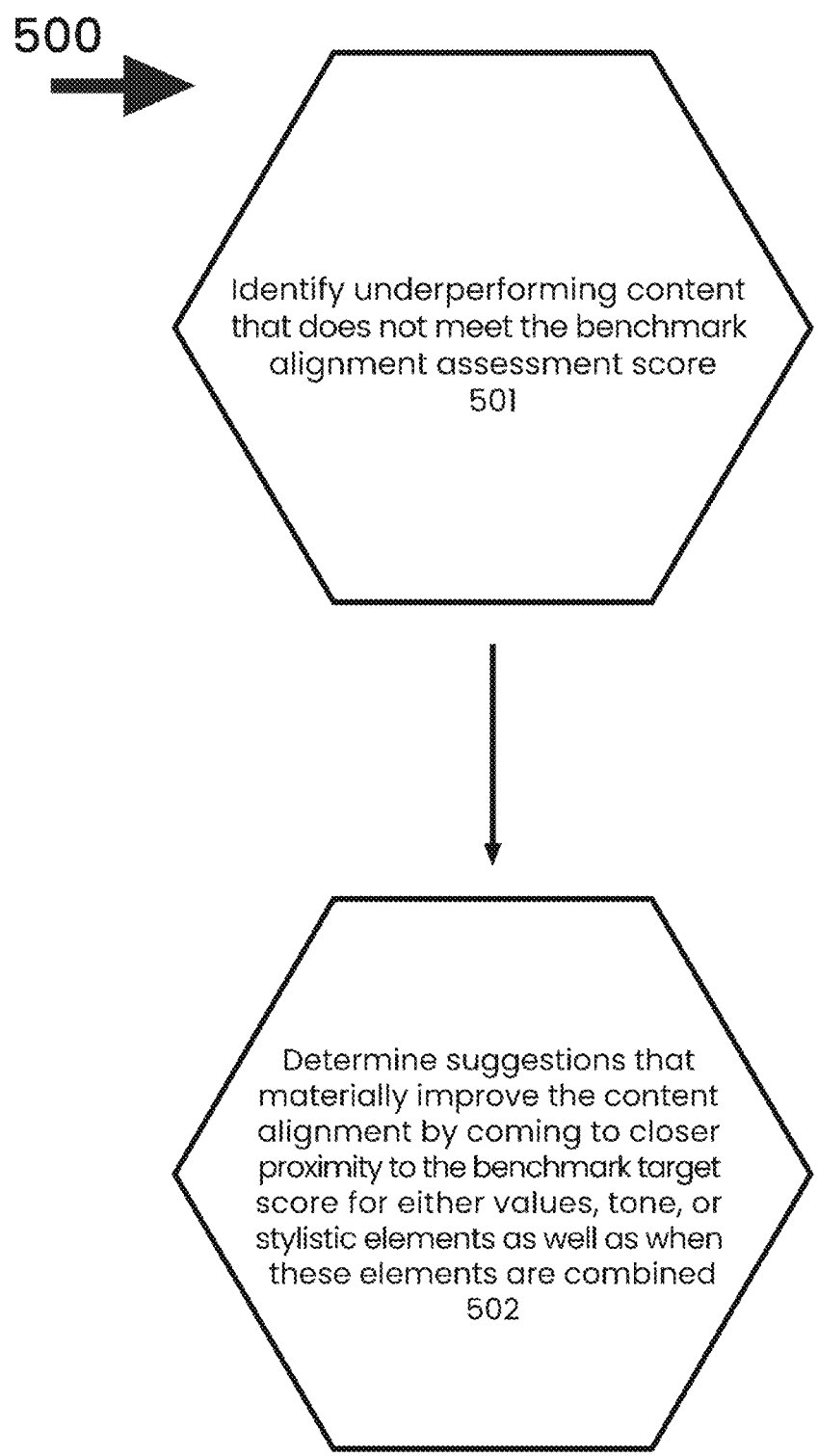
FIG. 5 illustrates exemplary generation of alternative content based on an overall alignment assessment in accordance disclosed teachings.

FIG. 5 is a diagram that illustrates alternative content generation method 500 based on the overall alignment assessment. In the exemplary embodiment, if a scored piece of content does not meet one of the various benchmarks, varying levels of automated suggestions to the text can be provided in the platform User Interface 104. The User can highlight or select from content that is underlined or shown to be underperforming in values or tone, and request optimization ideas or suggestions 501. Up to 10 texts are generated for the sentence selected. These are scored for values, tone and style based on the machine learned models. The platform User Interface 104 automatically selects suggestions that materially improve the content score by coming to closer proximity to the benchmark target score for either values, tone, or stylistic elements as well as when these elements are combined 502. The Suggestion Engine 126 also collects customer or language analysts feedback and validation for platform suggestions. This automatic feedback loop and data collection allows for further refinement from correctly suggested text that also meet the preferences of our customers.

In another embodiment, customers identify whether a result is "Relevant/Good" or "Not Helpful" or given a rating of overall quality, and other potential feedback and can select from potential reasons of unhelpfulness from suggestions that receive low ratings. This input is incorporated into the machine learning models for values and customer-specific models. As increasingly diverse scored texts across platforms and styles grows, suggestion models are refined. Models will require less texts to be generated before displaying optimal texts to the user.

A further embodiment of the suggestion engine includes document level suggestions. The Suggestion Engine 126 identifies all the underperforming sentences or chunks and compiles the best suggestions across underperforming segments of a text, using a content or text suggestion engine, and a version of the content that meets the benchmark is delivered in the platform to the requesting user and may be inserted or applied. The User Interface 104 depicts the before and after scoring, texts, and results for review.

In accordance with another exemplary scenario, additional lexical signals are developed to refine the alignment assessment scoring and subsequent language recommendations. In one embodiment, there is a platform wide block list where perfunctory words are identified that do not apply to content scoring and benchmark alignment. Words or phrases present in this list would skew results if included in the language intelligence calculations. One example is the word "newsletter". These words or phrases are removed from content scoring for all users of the platform.

In another embodiment, there can be a customer-specific grey list wherein perfunctory words can be deemphasized in the content scoring and benchmark alignment process despite their predictive qualities. For example, "bank" may be generally predictive, but "bank" for a banking customer is not. Similarly, words that should be deemphasized based on other factors, such as their mandatory inclusion in search engine optimization considerations.

In another embodiment, there can be customer-specific power words, phrases or larger language patterns and even customer specific "dictionaries:" wherein words or vocabulary or context that is particularly important or unique to that customer can be emphasized in content identification, scoring and suggestions and/or language generation and the benchmark alignment process.

In a further embodiment, toxic or unsafe language can be determined using a pattern matching engine and/or other specially trained natural language processing (NLP) system. These words or phrases are omitted from the content scoring and benchmark alignment process. In yet another embodiment, customer-specific power words can be highlighted and featured in the content scoring and benchmark alignment process.

Figure 6:
FIG. 6 illustrates an exemplary user interface for monitoring content alignment assessment and performance across multiple platforms in accordance with disclosed teachings.

FIG. 6 is a diagram that depicts an example user interface 600 (which may also be an example of User Interface 104) for monitoring content alignment assessment and performance across multiple platforms. In one embodiment, aggregate alignment assessments based on all the lexical benchmarks selected by the user 601, content volume published 603, values assessment 604, tone assessment 605, style assessments 606, and details of the levels of values and/or style and other lexical elements 607 are displayed in graphic form. These values are relevant to specific platforms and can be filtered by variables such as time-period and other factors. For example, platforms could include Facebook, LinkedIn, web hooks, client e-mails, blogs, or the similar. A listing is displayed of content that is provided on each of these specific platforms. Content feeds are processed with individualized metrics or performance indicators 602. Exemplary key performance indicators can be click through rates, engagement rates, etc. All content is scored for alignment across values, tone and style and can be filtered to uncover correlations and predictive lexical patterns of higher performing content based on the metrics and indicators. Content consistency and alignment can be determined across specific platforms. Similarly, opportunities to strengthen content response on certain platforms are identified as well as diagnosing the reason certain content is or is not resonating for target stakeholders. Content alignment assessment and performance results are shown in aggregate and at an individual content document level.

Figure 7:
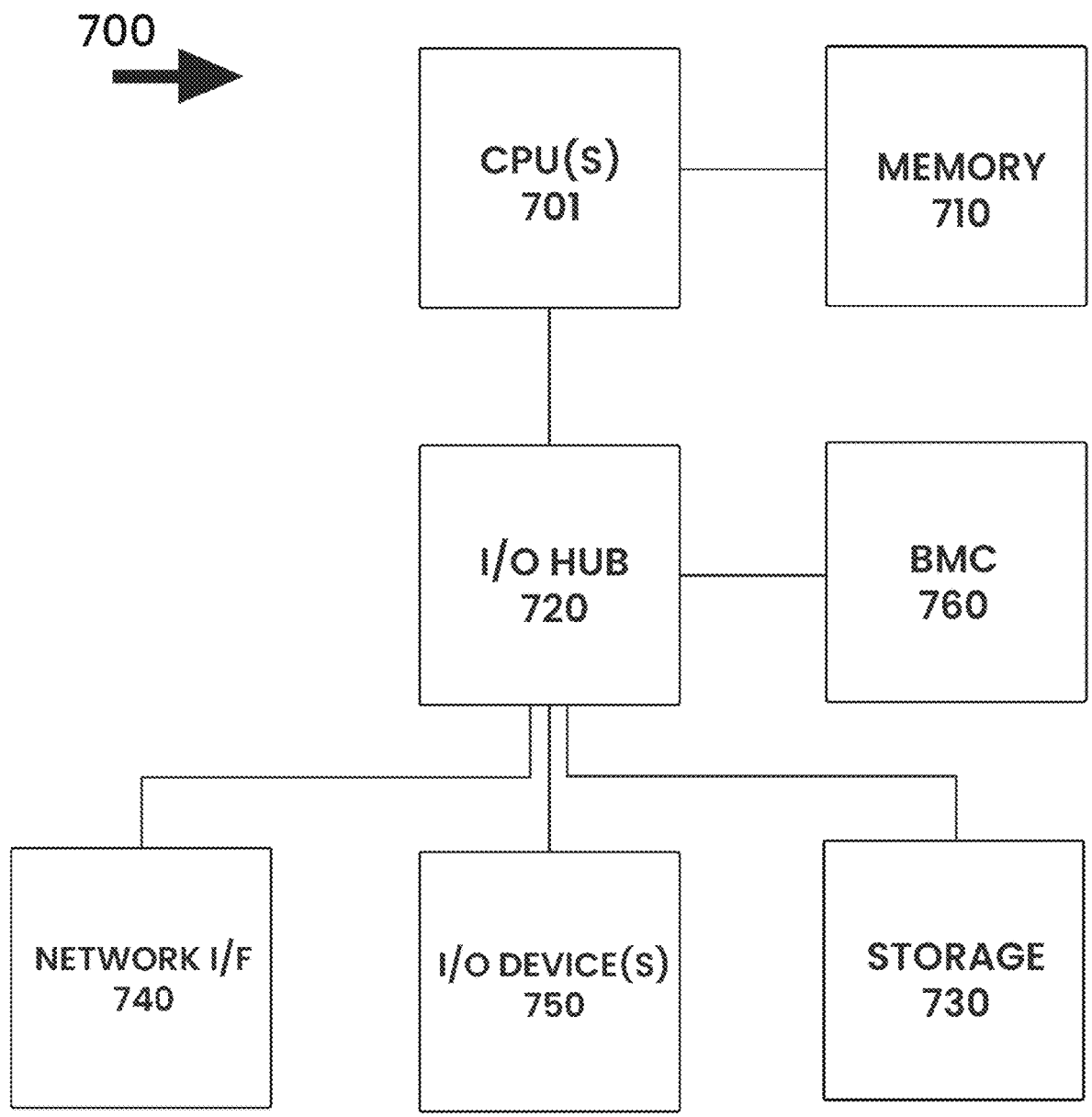
FIG. 7 illustrates an exemplary computer system that may be used to implement any one or more of the elements illustrated in FIG. 1 through FIG. 6.

Referring now to FIG. 7, any one or more of the elements illustrated in FIG. 1 through FIG. 6 may be implemented as or within an computer system exemplified by the computer system 700 illustrated in FIG. 7. The illustrated computer system includes one or more general purpose processors or central processing units (CPUs) 701 communicatively coupled to a memory resource 710 and to an input/output hub 720 to which various I/O resources and/or components are communicatively coupled. The I/O resources explicitly depicted in FIG. 7 include a network interface 740, commonly referred to as a NIC (network interface card), storage resources 730, and additional I/O devices, components, or resources 750 including as non-limiting examples, keyboards, mice, displays, printers, speakers, microphones, etc. The illustrated computer system 700 includes a baseboard management controller (BMC) 760 providing, among other features and services, an out-of-band management resource which may be coupled to a management server (not depicted). In at least some embodiments, BMC 760 may manage computer system 700 even when computer system 700 is powered off or powered to a standby state. BMC 760 may include a processor, memory, an out-of-band network interface separate from and physically isolated from an in-band network interface of computer system 700, and/or other embedded computer resources. In certain embodiments, BMC 760 may include or may be an integral part of a remote access controller.

The above example embodiments have been described hereinabove to illustrate various embodiments of implementing benchmarking and aligning content to target audiences. Various modifications and departures from the disclosed example embodiments will occur to those having ordinary skill in the art. The subject matter that is intended to be within the scope of the present disclosure is set forth in the following claims.

The invention claimed is:

1. A method for evaluating and generating content for a target audience, the method comprising:
    clustering consumer data to define one or more statistically distinct values segments wherein each values segment corresponds to an audience group associated with a set of ranked and specified personal values, wherein each of the personal values is associated with a motivational basis for behavior;
    for each values segment of the one or more values segments, generating an associated values segment dictionary based on the personal values associated with the audience group corresponding to the values segment, wherein the associated values segment dictionary includes terms, comprising words or phrases, likely to appeal to a member of the audience group;
    responsive to receiving electronic document content, performing two or more alignment evaluations, including an alignment evaluation corresponding to each of two or more types of alignment evaluations, to determine two or more alignment scores, wherein each alignment score is indicative of an extent to which the document content reflects or has affinity to characteristics of the audience group, wherein the two or more types of alignment evaluations include:
        a values-type alignment evaluation to determine a values alignment score indicative of a degree to which terms in the document content align with terms in the associated values-segment dictionary, wherein terms in the associated values-segment dictionary are determined based on a machine learning and natural language processing model of terms associated with the personal values of the audience group; and
        a second-type of alignment evaluation, distinct from the values-type of alignment evaluation;
    accessing benchmark scores including a benchmark score corresponding to each of the two or more types of alignment evaluations, wherein each of the benchmark scores reflects a user-defined alignment objective for a corresponding one of the two or more types of alignment evaluations;
    comparing an alignment score of the two or more alignment scores to a corresponding one of the two or benchmark scores;
    responsive to detecting the alignment score for at least a portion of the document content not meeting the corresponding benchmark score, providing a user interface including a visually detectable indication of the portion of the document content; and
    responsive to a user selection of the visually detectable indication of the portion of the document content, generating one or more content suggestions to replace the portion of the document content and increase the overall alignment score.

2. The method of claim 1, wherein the two or more alignment evaluations include at least one of:
    a tone-type alignment evaluation to determine a tone alignment score indicative of a degree to which one or more tones, associated with a machine learning and natural language model of a priority tone family indicative of a user-preferred tone, are present in the document content; and a style-type alignment evaluation to determine a style alignment score indicative of a degree to which a style of the document content aligns with a style associated with the target audience.

3. The method of claim 2, wherein the two or more alignment evaluations include the tone-type alignment evaluation and the style-type alignment evaluation.

4. The method of claim 3, wherein the style-type alignment evaluation is determined based on one or more style components, wherein the one or more style components include at least one of:
- a complexity component indicative of a school grade level needed to comprehend the document content; and
- a formality component indicative of an evaluated degree of conformance with one or more rules of convention.

5. The method of claim 3, further comprising generating a user interface to display one or more graphic elements, including one or more of:
- a values alignment graphic indicative of the values alignment score;
- a tone alignment graphic indicative of the tone alignment score;
- a style alignment graphic indicative of the style alignment score; and
- an overall alignment graphic indicative of an aggregate of the two or more alignment scores.

6. The method of claim 1, wherein the one or more values segments include:
- a safety-first segment corresponding to an audience group prioritizing personal values including personal protection and safety;
- a ladder segment corresponding to an audience group prioritizing personal values including personal achievement;
- a hearth segment corresponding to an audience group prioritizing personal values including tradition;
- a global me segment corresponding to an audience group prioritizing personal values including self expression; and
- a free spirt segment corresponding to an audience group prioritizing personal values including self-direction and spontaneity.

7. The method of claim 1, further comprising one or more of:
- accessing a black list including one or more black list terms and excluding the black list terms from the values-type alignment evaluation; and
- accessing an inclusion list including one or more inclusion list terms and including the inclusion list terms in the values alignment evaluation.

8. The method of claim 1, wherein the two or more alignment evaluations include a plurality of the values-type alignment evaluation and wherein the plurality of the value-type alignment evaluation includes any two or more of:
- a document-level values-type alignment evaluation;
- a sentence-level values-type alignment evaluation;
- a word-level values-type alignment evaluation;
- a phrase-level values-type alignment evaluation; and
- a sub sentence-level values-type alignment evaluation.

9. The method of claim 1, wherein the values alignment score is indicative of a degree to which terms in the document content align with terms in two or more of the associated values-segment dictionaries.

10. The method of claim 1, wherein the portion of the document content not meeting the corresponding benchmark score includes at least one of: one or more words not meeting the corresponding benchmark score and one or more sentences not meeting the corresponding benchmark score.

11. A non-transitory computer readable medium comprising computer readable instructions for generating content for a target audience, wherein the instructions, when executed by a processor, cause the processor to perform operations including:
- clustering consumer data to define one or more statistically distinct values segments wherein each values segment corresponds to an audience group associated with a set of ranked and specified personal values, wherein each of the personal values is associated with a motivational basis for behavior;
- for each values segment of the one or more values segments, generating an associated values segment dictionary based on the personal values associated with the audience group corresponding to the values segment, wherein the associated values segment dictionary includes terms, comprising words or phrases, likely to appeal to a member of the audience group;
- responsive to receiving electronic document content, performing two or more alignment evaluations, including an alignment evaluation corresponding to each of two or more types of alignment evaluations, to determine two or more alignment scores, wherein each alignment score is indicative of an extent to which the document content reflects or has affinity to characteristics of the audience group, wherein the two or more types of alignment evaluations include:
  - a values-type alignment evaluation to determine a values alignment score indicative of a degree to which terms in the document content align with terms in the associated values-segment dictionary, wherein terms in the associated values-segment dictionary are determined based on a machine learning and natural language processing model of terms associated with the personal values of the audience group; and
  - a second-type of alignment evaluation, distinct from the values-type of alignment evaluation;
- accessing benchmark scores including a benchmark score corresponding to each of the two or more types of alignment evaluations, wherein each of the benchmark scores reflects a user-defined alignment objective for a corresponding one of the two or more types of alignment evaluations;
- comparing an alignment score of the two or more alignment scores to a corresponding one of the two or benchmark scores;
- responsive to detecting the alignment score for at least a portion of the document content not meeting the corresponding benchmark score, providing a user interface including a visually detectable indication of the portion of the document content; and
- responsive to a user selection of the visually detectable indication of the portion of the document content, generating one or more content suggestions to replace the portion of the document content and increase the overall alignment score.

12. The computer readable medium of claim 11, wherein the two or more alignment evaluations include at least one of:
- a tone-type alignment evaluation to determine a tone alignment score indicative of a degree to which one or more tones, associated with a machine learning and natural language model of a priority tone family indicative of a user-preferred tone, are present in the document content; and
a style-type alignment evaluation to determine a style alignment score indicative of a degree to which a style of the document content aligns with a style associated with the target audience.

13. The computer readable medium of claim 12, wherein the two or more alignment evaluations include the tone-type alignment evaluation and the style-type alignment evaluation.

14. The computer readable medium of claim 13, wherein the style-type alignment evaluation is determined based on one or more style components, wherein the one or more style components include at least one of:
    a complexity component indicative of a school grade level needed to comprehend the document content; and
    a formality component indicative of a degree of conformance with one or more rules of convention.

15. The computer readable medium of claim 11, wherein the one or more values segments include:
    a safety-first segment corresponding to an audience group prioritizing personal values including personal protection and safety;
    a ladder segment corresponding to an audience group prioritizing personal values including personal achievement;
    a hearth segment corresponding to an audience group prioritizing personal values including tradition;
    a global me segment corresponding to an audience group prioritizing personal values including self expression; and
    a free spirt segment corresponding to an audience group prioritizing personal values including self-direction and spontaneity.

16. A system for evaluating an alignment of an electronic document or piece of content with a target benchmark, comprising:
    a processor for executing computer program instructions; and
    a non-transitory computer readable storage medium storing computer program instructions that, when executed by the processor, cause the system to perform operations comprising:
    clustering consumer data into one or more statistically distinct values segments wherein each values segment corresponds to an audience group associated with a set of ranked and specified personal values, wherein each of the personal values is associated with a motivational basis for behavior;
    for each values segment of the one or more values segments, generating an associated values segment dictionary based on the personal values associated with the audience group corresponding to the values segment, wherein the associated values segment dictionary includes terms, comprising words or phrases, likely to appeal to a member of the audience group;
    responsive to receiving electronic document content, performing two or more alignment evaluations, including an alignment evaluation corresponding to each of two or more types of alignment evaluations, to determine two or more alignment scores, wherein each alignment score is indicative of an extent to which the document content reflects or has affinity to characteristics of the audience group, wherein the two or more types of alignment evaluations include:
        a values-type alignment evaluation to determine a values alignment score indicative of a degree to which terms in the document content align with terms in the associated values-segment dictionary, wherein terms in the associated values-segment dictionary are determined based on a machine learning and natural language processing model of terms associated with the personal values of the audience group; and
        a second-type of alignment evaluation, distinct from the values-type of alignment evaluation;
    accessing benchmark scores including a benchmark score corresponding to each of the two or more types of alignment evaluations, wherein each of the benchmark scores reflects a user-defined alignment objective for a corresponding one of the two or more types of alignment evaluations;
    comparing an alignment score of the two or more alignment scores to a corresponding one of the two or benchmark scores;
    responsive to detecting the alignment score for at least a portion of the document content not meeting the corresponding benchmark score, providing a user interface including a visually detectable indication of the portion of the document content; and
    responsive to a user selection of the visually detectable indication of the portion of the document content, generating one or more content suggestions to replace the portion of the document content and increase the overall alignment score.

17. The system of claim 16, wherein the two or more alignment evaluations include at least one of:
    a tone-type alignment evaluation to determine a tone alignment score indicative of a degree to which one or more tones, associated with a machine learning and natural language model of a priority tone family indicative of a user-preferred tone, are present in the document content; and
    a style-type alignment evaluation to determine a style alignment score indicative of a degree to which a style of the document content aligns with a style associated with the target audience.

18. The system of claim 17, wherein the two or more alignment evaluations include the tone-type alignment evaluation and the style-type alignment evaluation.

19. The system of claim 18, wherein the style-type alignment evaluation is determined based on one or more style components, wherein the one or more style components include at least one of:
    a complexity component indicative of a school grade level needed to comprehend the document content; and
    a formality component indicative of a degree of conformance with one or more rules of convention.

20. The system of claim 16, wherein the one or more values segments include:
    a safety-first segment corresponding to an audience group prioritizing personal values including personal protection and safety;
    a ladder segment corresponding to an audience group prioritizing personal values including personal achievement;
    a hearth segment corresponding to an audience group prioritizing personal values including tradition;
    a global me segment corresponding to an audience group prioritizing personal values including self expression; and a free spirt segment corresponding to an audience group prioritizing personal values including self-direction and spontaneity.

\* \* \* \* \*